(12) United States Patent
Gutermuth et al.

(10) Patent No.: US 10,144,898 B2
(45) Date of Patent: Dec. 4, 2018

(54) LUBRICANT COMPOSITIONS FOR IMPROVED HIGH PRESSURE FREE-RADICAL POLYMERIZATIONS

(71) Applicant: Dow Global Technologies LLC, Midland, MI (US)

(72) Inventors: Bryan Gutermuth, Angleton, TX (US); Sean W. Ewart, Pearland, TX (US); Jeffery S. Bradley, Missouri City, TX (US); Otto J. Berbee, Hulst (NL)

(73) Assignee: Dow Global Technologies LLC, Midland, MI (US)

( * ) Notice: Subject to any disclaimer, the term of this patent is extended or adjusted under 35 U.S.C. 154(b) by 0 days.

(21) Appl. No.: 15/521,663

(22) PCT Filed: Nov. 12, 2015

(86) PCT No.: PCT/US2015/060255
§ 371 (c)(1),
(2) Date: Apr. 25, 2017

(87) PCT Pub. No.: WO2016/077512
PCT Pub. Date: May 19, 2016

(65) Prior Publication Data
US 2017/0260474 A1    Sep. 14, 2017

Related U.S. Application Data

(60) Provisional application No. 62/079,345, filed on Nov. 13, 2014.

(51) Int. Cl.
| | |
|---|---|
| *C10M 135/36* | (2006.01) |
| *C08F 2/38* | (2006.01) |
| *C10M 133/40* | (2006.01) |
| *C10M 129/14* | (2006.01) |
| *C08F 210/02* | (2006.01) |
| *C08F 220/06* | (2006.01) |
| *C08F 220/16* | (2006.01) |
| *C08F 120/06* | (2006.01) |

(52) U.S. Cl.
CPC ............ *C10M 135/36* (2013.01); *C08F 2/38* (2013.01); *C08F 210/02* (2013.01); *C08F 220/06* (2013.01); *C08F 220/16* (2013.01); *C10M 129/14* (2013.01); *C10M 133/40* (2013.01); *C08F 120/06* (2013.01); *C08F 2/38* (2013.01); *C10M 2203/1006* (2013.01); *C10M 2207/023* (2013.01); *C10M 2215/221* (2013.01); *C10M 2219/108* (2013.01); *C10N 2240/30* (2013.01); *Y02P 20/582* (2015.11)

(58) Field of Classification Search
CPC .................... C10M 135/36; C10M 133/40
USPC ................... 508/251, 262, 580, 587
See application file for complete search history.

(56) References Cited

U.S. PATENT DOCUMENTS

| | | | |
|---|---|---|---|
| 4,498,998 A * | 2/1985 | Hutchison | ............ C10M 129/14 252/404 |
| 4,721,761 A | 1/1988 | Omae et al. | |
| 7,413,615 B2 | 8/2008 | Yada et al. | |

FOREIGN PATENT DOCUMENTS

| | | |
|---|---|---|
| JP | 58019393 | 2/1983 |
| SU | 630284 A1 | 10/1978 |
| WO | 2014/106067 A1 | 7/2014 |
| WO | 2017/004320 | 1/2017 |

OTHER PUBLICATIONS

PCT/US2015/060255, International Search Report and Written Opinion dated May 11, 2016.
PCT/US2015/060255, International Preliminary Report on Patentability dated May 26, 2017.

* cited by examiner

*Primary Examiner* — Fred M Teskin
(74) *Attorney, Agent, or Firm* — Dinsmore & Shohl LLP

(57) ABSTRACT

The invention provides a composition comprising at least the following: an oil, and at least one compound selected from Compounds 1 through 3, or a combination thereof, as described herein. The composition can be used to improve the high pressure, free-radical polymerizations of ethylene-based interpolymers, and to reduce polymer build-up in reciprocation devices throughout the process.

19 Claims, 1 Drawing Sheet

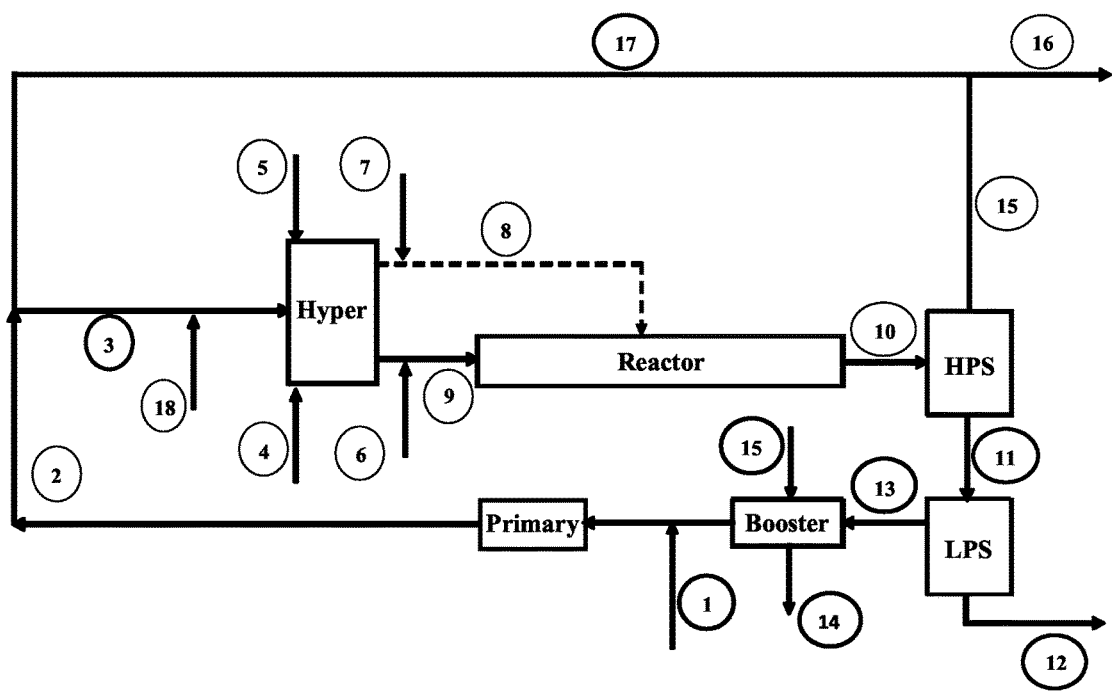

LUBRICANT COMPOSITIONS FOR IMPROVED HIGH PRESSURE FREE-RADICAL POLYMERIZATIONS

REFERENCE TO RELATED APPLICATIONS

This application claims the benefit of U.S. Provisional Application No. 62/079,345, filed Nov. 13, 2014, and incorporated herein by reference.

BACKGROUND OF THE INVENTION

The undesired self-polymerization of a reactive polar comonomer, in high pressure free radical polymerizations, have been studied and countered using polymerization inhibitors and other methods. See, for example, U.S. Pat. No. 4,721,761, U.S. Pat. No. 7,413,615 and International Publication WO2014/106067. However, there is a need for new lubricant compositions that can be used to reduced the self-polymerization of polar comonomers, and prevent the premature failure of devices (for example, rotational and/or reciprocating devices) in contact with the comonomer. This need has been met by the following invention.

SUMMARY OF INVENTION

The invention provides a composition comprising at least the following:

A) an oil, and

B) at least one compound selected from the following compounds i) through iv):

i)

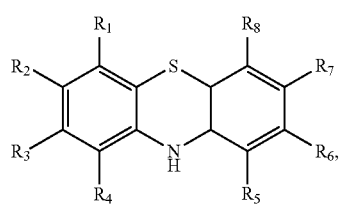
(Compound 1)

wherein, for Compound 1, R1 R2, R3, R4, R5, R6, R7 and R8 are each independently selected from H, an alkyl, or an alkoxy;

ii)

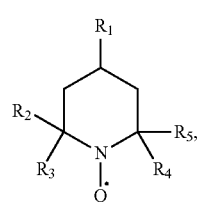
(Compound 2)

wherein, for Compound 2, R1 is selected from OH or OR, wherein R is alkyl; and R2, R3, R4 and R5 are each independently selected from H, an alkyl, or an alkoxy;

iii)

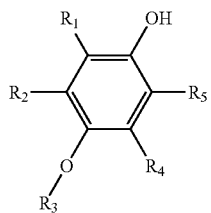
(Compound 3)

wherein, for Compound 3, R1, R2, R4 and R5 are each independently selected from H, an alkyl, or an alkoxy; and R3 is selected from H or an alkyl; or iv) a combination of two or more of Compounds 1 through 3; and wherein the composition comprises less than, or equal to, 1.0 weight percent (based on the weight of the composition) of a non-aromatic polar compound, excluding alcohols, and other than Compound 2 above, and wherein the non-aromatic compound has Dipole Moment greater than, or equal to, 1.00 Debye.

BRIEF DESCRIPTION OF THE DRAWINGS

FIG. 1 depicts a general flow diagram showing a reactor system for a high pressure copolymerization process, and comprising an autoclave, tubular reactor, or a combination of both reactors.

DETAILED DESCRIPTION

As discussed above, the invention provides a composition comprising at least the following:

A) an oil, and

B) at least one compound selected from the following compounds i) through iv):

i)

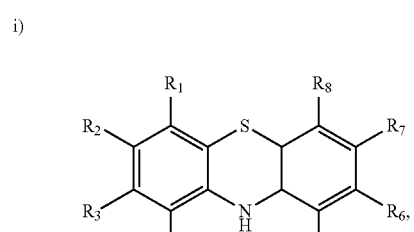
(Compound 1)

wherein, for Compound 1, R1, R2, R3, R4, R5, R6, R7 and R8 are each independently selected from H, an alkyl, or an alkoxy;

ii)

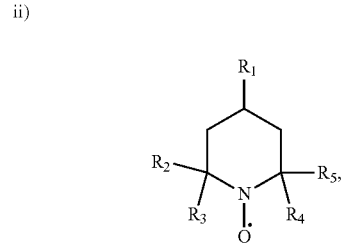
(Compound 2)

wherein, for Compound 2, R1 is selected from OH or OR, wherein R is alkyl; and R2, R3, R4 and R5 are each independently selected from H, an alkyl, or an alkoxy;

iii)

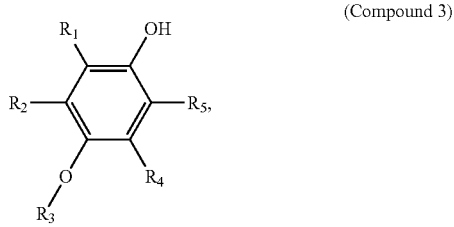

(Compound 3)

wherein, for Compound 3, R1, R2, R4 and R5 are each independently selected from H, an alkyl, or an alkoxy; and R3 is selected from H or an alkyl; or iv) a combination of two or more of Compounds 1 through 3; and wherein the composition comprises less than, or equal to, 1.0 weight percent, further less than, or equal to, 0.5 weight percent, further less than, or equal to, 0.2 weight percent, further less than, or equal to, 0.1 weight percent (based on the weight of the composition) of a non-aromatic polar compound, excluding alcohols, and other than Compound 2 above, and wherein the non-aromatic compound has a Dipole Moment greater than, or equal to, 1.00 debye, further greater than, or equal to, 1.10, further greater than, or equal to, 1.20, further greater than, or equal to 1.30.

As used herein $R_1$=R1, $R_2$=R2, $R_3$=R3, and so forth.

An inventive composition may comprise two or more embodiments as described herein.

In one embodiment, the oil is a mineral oil. In a further embodiment, the oil has a kinematic viscosity, at 40° C., from 50 to 200 mm$^2$/s.

In one embodiment, the compound is present in an amount from 5 to 60,000 ppm, based on the weight of the oil. In a further embodiment, the compound is present in an amount from 5 to 40,000 ppm, further from 5 to 20,000 ppm, based on the weight of the oil.

In one embodiment, the compound is present in an amount from 5 to 10,000 ppm, further from 5 to 5,000 ppm, further from 5 to 2,000 ppm, further from 5 to 1,000 ppm, based on the weight of the oil.

In one embodiment, the compound is present in an amount from 5 to 700 ppm, further from 5 to 500 ppm, further from 5 to 200 ppm, further from 5 to 100 ppm, based on the weight of the oil.

In one embodiment, the oil and compound comprise greater than, or equal to, 99.0 weight percent of the composition, based on the weight of the composition. In a further embodiment, the oil and compound comprise greater than, or equal to, 99.5 weight percent of the composition, based on the weight of the composition. In a further embodiment, the oil and compound comprise greater than, or equal to, 99.8 weight percent of the composition, based on the weight of the composition.

In one embodiment, the compound is selected from the following compounds a) through d):

a)

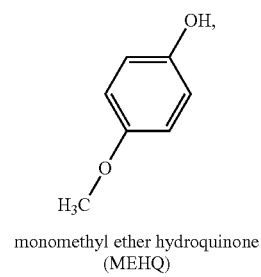

monomethyl ether hydroquinone (MEHQ)

b)

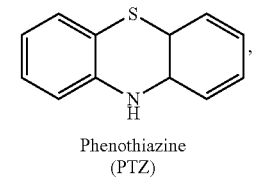

Phenothiazine (PTZ)

c)

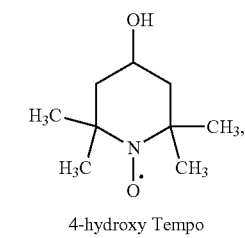

4-hydroxy Tempo or d) a combination thereof.

The invention also provides a process to prepare an ethylene-based interpolymer, said process comprising polymerizing a mixture comprising ethylene and at least one comonomer containing acid and/or ester groups, at a pressure greater than, or equal to, 100 MPa, in the presence of at least one free-radical initiator; and in a reactor system comprising at least one reactor and at least one component selected from the following:

a) a reciprocation device (for example, a pressurization pump or a compressor), b) a rotation device (for example, a rotational agitator), c) or combination thereof; and wherein an inventive composition is injected into the at least one component.

In one embodiment, the composition is continually injected into the at least one component. In a further embodiment, the composition is injected at a rate of 2 to 150 lbs/hr, further from 3 to 120 lbs/hr, further from 5 to 100 lbs/hr, further from 8 to 80 lbs/hr, further from 10 to 60 lbs/hr.

In one embodiment, the at least one component is a reciprocation device. In a further embodiment, the reciprocation device is a Hyper-compressor. In a further embodiment, the discharge pressure in the Hyper-compressor is from 100 MPa to 400 MPa.

In one embodiment, the composition is injected at one or more injection points into the Hyper-compressor. In a further embodiment, the composition is injected at two or more injection points into the Hyper-compressor.

In one embodiment, the comonomer is selected from acrylic acid, ethylene acrylate, or a combination thereof.

The invention also provides a process to reduce polymer build-up in a reciprocation device and/or rotational device, used in the polymerization of a mixture comprising ethylene and at least one comonomer containing acid and/or ester groups, said process comprising injecting an inventive composition into the reciprocation device and/or rotational device. In a further embodiment, the polymerization takes place at a pressure greater than, or equal to, 100 MPa, and in the presence of at least one free-radical initiator.

In one embodiment, the composition is continually injected into the reciprocation device and/or rotational device. In a further embodiment, the composition is injected at a rate of 5 to 100 lbs/hr, further at a rate of 10 to 80 lbs/hr, further from 20 to 60 lbs/hr.

In one embodiment, the composition is injected into a reciprocation device. In a further embodiment, the reciprocation device is a Hyper-compression. In a further embodiment, the composition is injected at one or more injection points into the Hyper-compressor. In a further embodiment, the composition is injected at two or more injection points into the Hyper-compressor.

In one embodiment, the discharge pressure in the Hyper-compressor is from 100 MPa to 400 MPa.

In one embodiment, the comonomer is selected from acrylic acid, ethylene acrylate, or a combination thereof.

An inventive process may comprise a combination of two or more embodiments as described herein.

The following embodiments apply the inventive processes described above.

In one embodiment, the pressure in at least one reactor is greater than, or equal to, 110 MPa, further greater than, or equal to, 130 MPa, further greater than, or equal to, 150 MPa.

In one embodiment, at least one reactor is present in a reactor configuration, in which the comonomer (for example, acrylic acid (AA)) is injected into an ethylene feed, which is fed directly or indirectly to the top zone of a reactor. In a further embodiment, a CTA is fed primarily the top zone (for example, to narrow MWD of high acid products).

In one embodiment, the comonomer is an alkylacrylate. Suitable acrylates include methyl, ethyl, propyl, butyl and higher acrylates.

In one embodiment, the comonomer is an alkylmethacrylate. Suitable methacrylates include methyl, ethyl, propyl, butyl and higher methacrylates.

In one embodiment, the temperature in at least one reactor is greater than, or equal to, 170° C., further greater than, or equal to, 200° C., further greater than, or equal to, 220° C.

An inventive method may comprise a combination of two or more embodiments as described herein.

The invention also provides a composition comprising an ethylene-based polymer formed from an inventive method of one or more embodiments described herein.

In one embodiment, the ethylene-based interpolymer comprises, in the polymerized form, from 1 to 30 weight percent comonomer, further from 3 to 28 weight percent comonomer, and further from 5 to 25 weight percent comonomer, based on the weight of the polymer.

In one embodiment, the ethylene-based interpolymer has a density from 0.900 to 0.955 g/cc, further from 0.900 to 0.950 g/cc (1 cc=1 cm$^3$).

In one embodiment, the ethylene-based interpolymer has a melt index (I2) from 0.2 to 5000 g/10 min, further from 0.5 to 4000 g/10 min, and further 1 to 3000 g/10 min.

In one embodiment, the composition further comprises a second ethylene-based polymer.

In one embodiment, the second ethylene-based polymer is selected from an ethylene/alpha-olefin copolymer, a low density polyethylene (LDPE), a high density polyethylene (HDPE), or a combination thereof.

In one embodiment, the second ethylene-based polymer is a LDPE homopolymer.

In one embodiment, the second ethylene-based polymer is a linear low density polyethylene (LLDPE). Linear low density polyethylenes (LLDPEs) include copolymers of ethylene with one or more alpha-olefins, such as, but not limited to, propylene, butene-1, pentene-1, 4-methylpentene-1, pentene-1, hexene-1 and octene-1.

The composition may comprise a combination of two or more embodiments as described herein.

The invention also provides an article comprising at least one component formed from an inventive composition.

In one embodiment, the article is selected from a coating, a film, a foam, a laminate, a fiber, or a tape.

In one embodiment, the article is an aqueous dispersion (for example, a dispersion coating for paper, (fertilizer) granules, etc.).

In one embodiment, the article is an extrusion coating. In another embodiment, the article is a film.

An inventive article may comprise a combination of two or more embodiments as described herein.

Inventive Composition

An inventive composition comprises at least the following:

A) an oil, and

B) at least one compound selected from the following compounds i) through iv):

i)

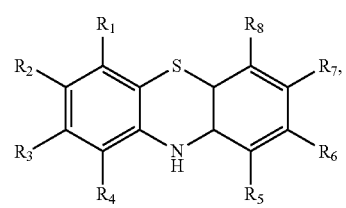

(Compound 1)

wherein, for Compound 1, R1, R2, R3, R4, R5, R6, R7 and R8 are each independently selected from H, an alkyl, or an alkoxy, and further from H or alkyl (for example, a C1-5 alkyl), and further H;

ii)

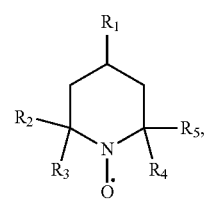

(Compound 2)

wherein, for Compound 2, R1 is selected from OH of OR, where R is alkyl (for example, a C1-C5 alkyl), and further R1 is OH; R2, R3, R4 and R5 are each independently selected from H, an alkyl, or an alkoxy, and further from H or alkyl, and further alkyl, and further a C1-C5 alkyl;

iii)

(Compound 3)

[Structure of Compound 3: phenol ring with R1, R2, R4, R5 substituents and OR3 group]

wherein, for Compound 3, R1, R2, R4 and R5 are each independently selected from H, an alkyl, or an alkoxy, further from H or alkyl, further H; and R3 is selected from H or an alkyl, further alkyl, and further a C1-C5 alkyl; or iv) a combination of two or more of Compounds 1 through 3; and wherein the composition comprises less than, or equal to, 1.0 weight percent, further less than, or equal to, 0.5 weight percent, and further less than, or equal to, 0.2 weight percent, and further less than, or equal to 0.1 weight percent (based on the weight of the composition) of a non-aromatic polar compound, excluding alcohols, and other than Compound 2 above, and wherein the non-aromatic polar compound has a Dipole Moment greater than, or equal to, 1.00 Debye, further greater than, or equal to, 1.10, further greater than, or equal to, 1.20, further greater than, or equal to. 1.30.

In one embodiment, the at least one compound selected from the following compounds i), ii), or a combination thereof:

i)

(Compound 1)

[Structure of Compound 1: phenothiazine-type structure]

wherein, for Compound 1, R1, R2, R3, R4, R5, R6, R7 and R8 are each independently selected from H, an alkyl, or an alkoxy, and further from H or alkyl (for example, a C1-C5 alkyl), and further H;

ii)

(Compound 2)

[Structure of Compound 2: piperidine N-oxide with R1-R5 substituents]

wherein, for Compound 2, R1 is selected from OH of OR, where R is alkyl (for example, a C1-5 alkyl), and further R1 is OH; R2, R3, R4 and R5 are each independently selected from H, an alkyl, or an alkoxy, and further from H or alkyl, and further alkyl, and further a C1-C5 alkyl.

In one embodiment, the at least one compound selected from Compound 1:

i)

(Compound 1)

[Structure of Compound 1]

wherein, for Compound 1, R1, R2, R3, R4, R5, R6, R7 and R8 are each independently selected from H, an alkyl, or an alkoxy, and further from H or alkyl (for example, a C1-C5 alkyl), and further H.

In one embodiment, the compound is selected from Compound 2:

ii)

(Compound 2)

[Structure of Compound 2]

wherein, for Compound 2, R1 is selected from OH of OR, where R is alkyl (for example, a C1-C5 alkyl), and further R1 is OH; R2, R3, R4 and R5 are each independently selected from H, an alkyl, or an alkoxy, and further from H or alkyl, and further alkyl, and further a C1-C5 alkyl.

In one embodiment, the compound is selected from Compound 3:

iii)

(Compound 3)

[Structure of Compound 3]

wherein, for Compound 3, R1, R2, R4 and R5 are each independently selected from H, an alkyl, or an alkoxy, further from H or alkyl, further H; and R3 is selected from H or an alkyl, further alkyl, and further a C1-C5 alkyl.

High Pressure Free Radical Polymerization, Process Characteristics

The term "high pressure polymerization process," as used herein, refers to a free radical polymerization process in which homo- and or copolymerization is carried out at an elevated pressure typically of at least 100 MPa (for example, 100 MPa to 500 MPa) and elevated temperature (for example, 100 to 400° C.) conditions. High molecular weight, normally solid copolymers of ethylene and unsaturated carboxylic acids, such as acrylic acid and methacrylic acid, are well known (see for example, U.S. Pat. No. 3,132,120).

There are two main reactor types to produce, by a high pressure, free radical polymerization process, copolymers of ethylene and unsaturated carboxylic acids, namely the autoclave reactor and the tubular reactor. The autoclave process enables production of homogeneous, ethylene carboxylic acid interpolymer, while the tubular process, due to the high reactivity of carboxylic acid, will lead to less homogeneous ethylene-carboxylic acid interpolymers.

Initiators

The process of the present invention is a free radical polymerization process. Free radical initiators that are generally used include organic peroxides, such as peresters, perketals, peroxy ketones, percarbonates and cyclic multifunctional peroxides. These organic peroxide initiators are used in conventional amounts, typically from 0.005 to 0.2 weight percent based on the weight of polymerizable monomers. Other suitable initiators include azodicarboxylic esters, azodicarboxylic dinitriles and 1,1,2,2-tetramethylethane derivatives, and other components, capable of forming free radicals in the desired operating temperature range. Peroxides are typically injected as diluted solutions in a suitable solvent, for example, in a hydrocarbon solvent.

Chain Transfer Agents (CTA)

Chain transfer agents or telogens are used to control the melt index in a polymerization process. Chain transfer involves the termination of growing polymer chains, thus limiting the ultimate molecular weight of the polymer material. Chain transfer agents are typically hydrogen atom donors that will react with a growing polymer chain, and stop the polymerization reaction of the chain, and initiate the growth of a new polymer molecule. These agents can be of many different types, from saturated hydrocarbons, or unsaturated hydrocarbons, to aldehydes, ketones or alcohols. By controlling the concentration of the selected chain transfer agent, one can control the length of polymer chains, and, hence the molecular weight, for example, the number average molecular weight, Mn. The melt flow index (MFI or $I_2$) of a polymer, which is related to Mn, is controlled in the same way.

Suitable chain transfer agents include, but are not limited to, aliphatic and olefinic hydrocarbons, such as pentane, hexane, cyclohexane, propene, pentene or hexane; ketones such as acetone, diethyl ketone, methyl ethyl ketone (MEK) or diamyl ketone; aldehydes such as formaldehyde or acetaldehyde, propionaldehyde; and saturated aliphatic aldehyde alcohols such as methanol, ethanol, propanol or butanol. The chain transfer agent may also be a monomeric chain transfer agent. For example, see WO 2012/057,975, U.S. 61/579,067 and U.S. 61/664,956. Furthermore the melt-index can be influenced by the build up and control of incoming ethylene impurities, like methane and ethane, peroxide dissociation products, like tert-butanol, acetone, etc., and or solvent components used to dilute the initiators. These ethylene impurities, peroxide dissociation products and/or dilution solvent components can act as chain transfer agents.

Polymers

In one embodiment, an ethylene-based polymer of this invention has a density from 0.910 to 0.960, more typically from 0.915 to 0.950, and even more typically from 0.920 to 0.940, grams per cubic centimeter (g/cc or g/cm$^3$). In one embodiment, an ethylene-based polymer of the invention has a melt index ($I_2$) from 0.2 to 5000 grams per 10 minutes (g/10 min) at 190° C./2.16 kg, further from 0.5 to 2000 grams per 10 minutes (g/10 min) at 190° C./2.16 kg, further from 1.0 to 1500 grams per 10 minutes (g/10 min) at 190° C./2.16 kg.

In one embodiment, the ethylene-based polymer is selected from ethylene acrylic acid (EAA), ethylene methacrylic acid (EMAA), vinyl acetate, ethyl acrylate, or butyl acrylate. Also, optional secondary comonomers include carbon monoxide, silane-containing comonomers, and others. Terpolymers, such as ethylene-AA-MAA terpolymers may also be formed. Other suitable secondary or higher comonomers to be used in the ethylene-based polymers of the present invention include, but are not limited to, ethylenically unsaturated monomers and especially $C_{3-20}$ alpha-olefins, carbon monoxide, vinyl acetate, and $C_{2-6}$ alkyl acrylates. Other suitable secondary or higher comonomers are described in Ehrlich, P.; Mortimer, G. A.; Adv. Polymer Science; Fundamentals of Free-Radical Polymerization of Ethylene; Vol. 7, pp. 386-448 (1970)—see reference 1.

Additives

One or more additives may be added to a composition comprising an inventive polymer. Suitable additives include stabilizers; fillers, such as organic or inorganic particles, including clays, talc, titanium dioxide, zeolites, powdered metals, organic or inorganic fibers, including carbon fibers, silicon nitride fibers, steel wire or mesh, and nylon or polyester cording, nano-sized particles, clays, and so forth; tackifiers, oil extenders, including paraffinic or naphthelenic oils.

Definitions

Unless stated to the contrary, implicit from the context, or customary in the art, all parts and percents are based on weight, and all test methods are current as of the filing date of this disclosure.

The term "oil" is known in the art, and typically refers to viscous liquid with increased viscosity, as compared to that of water at the same temperature and pressure, and which is derived from petroleum. The oil provides lubrication and reduced friction between moving surfaces of rotational and/or reciprocating mechanisms. The oil can consist of single and/or multiple components. Additives might be added to improve lubricity, flow properties, thermal stability, and/or other properties. Examples of suitable oils include mineral oils.

The term "polymer" refers to a compound prepared by polymerizing monomers, whether of the same or a different type. The generic term polymer thus embraces the term homopolymer (which refers to polymers prepared from only one type of monomer with the understanding that trace amounts of impurities can be incorporated into the polymer structure), and the term "interpolymer" as defined below. Trace amounts of impurities may be incorporated into and/or within the polymer.

The term "interpolymer" refers to polymers prepared by the polymerization of at least two different types of monomers. The generic term interpolymer includes copolymers (which refers to polymers prepared from two different monomers), and polymers prepared from more than two different types of monomers.

The term "ethylene-based polymer" refers to a polymer that comprises a majority amount of polymerized ethylene, based on the weight of the polymer, and, optionally, at least one comonomer.

The term "ethylene-based interpolymer" refers to an interpolymer that comprises a majority amount of polymerized ethylene, based on the weight of the interpolymer, and at least one comonomer.

The term "ethylene-based copolymer" refers to a copolymer that comprises a majority amount of polymerized ethylene, based on the weight of the interpolymer, and a comonomer as the only monomer types.

The phrase "high pressure, free-radical polymerization process," as used herein, refers to a free radical initiated polymerization, carried out at an elevated pressure of at least 100 MPa (1000 Bar).

The terms "feed" or "feed stream," as used herein, refer to fresh and/or recycled reactant(s) added to a reaction zone at an inlet to the reaction zone.

The term "make-up," when used herein, in reference to a reactant(s) (i.e., "make-up ethylene," "make-up CTA," "make-up comonomer" etc.), refers to the feed stream of the reactant(s) needed to compensate for the converted and/or lost reactant(s) in the high pressure polymerization process.

The term "fresh," when used herein, in reference to a reactant(s) (i.e., "fresh ethylene," "fresh CTA"), refers to reactant(s) provided from an external source(s), and not provided internally from a recycled source(s). For example, in an embodiment, fresh ethylene is used as "make-up ethylene" required to compensate for the ethylene consumed by the polymerization and/or lost through, for example, purge from the process, or for residual ethylene in the polymer.

The term "reaction zone," as used herein, refers to a reactor zone where polymerization reaction is initiated or reinitiated by the addition of free radicals and/or the decomposition of components into free radicals or which generate free radicals.

The term "reactor system," as used herein, refers to the components (devices) used to polymerize and isolate a polymer. Such components/devices include, but are not limited to, one or more reactors, a Hyper-compressor, a Primary compressor, and a Booster compressor.

The term "injection point," as used herein, refers to the inlet location of a device (used in a polymerization process) where a feed stream is added into the device.

The term "reciprocation device," as used herein, refers to a device that generates a repetitive linear motion, such as an up-and-down linear motion or a back-and-forth linear motion. Examples of such devices include a plunger pump or a plunger compressor.

The term "rotation device," as used herein, refers to a device that generates a repetitive angular displacement around a central axis. Examples of such devices include a rotational agitator and a rotational compressor.

The term "rotational agitator," as used herein, refers to the agitator mounted in a high pressure autoclave, driven by an internal or external driver, for example, an electric motor, and providing, through its rotational movement, the required back-mixing, to carry out the reaction at well-mixed and stable conditions within a reaction zone of the reactor. The rotational agitator is supported by an internal bearing system. The reliability of the bearing system is affected by the occurrence of self-polymerization of the high reactive comonomer and/or metallurgic corrosion by the polar nature of the comonomer. Feeding the inventive composition will greatly improve the lubrication in the bearing, and reverse above negative effects in the bearing system.

The term "pressurization pump" refers to a pumping device which increases the pressure level a liquid or feed to a higher pressure level.

The term "pressurizing" refers to increasing the pressure a liquid or feed to a higher pressure level.

The term "compression system" refers to a compression device, which increases the pressure a vapor (for example, ethylene vapor below or above its critical point) to a higher pressure level.

The term "compression" refers to increasing the pressure of a vapor (for example, ethylene vapor below or above its critical point) to a higher pressure level.

The Booster compressor (Booster) is a device that compresses, for example, the following: a) the low pressure recycle coming from the LPS (Low pressure Separator), and b) optionally, the recycled compressor packing leaks; each to the pressure level required at the inlet side of the Primary compressor. This compression can take place in one or multiple compression stages, and can be combined with intermediate cooling. A Booster can consist of single or multiple compressor frames, and can be potentially combined with Primary compressor frame(s).

The Primary compressor (Primary) is a device that compresses, for example, the following: a) the fresh incoming ethylene, and/or b) the low pressure recycle coming from the Booster, and/or c) the recycled compressor packing leaks; each to the pressure level required at the inlet side of the Hyper compressor. This compression can take place in one or multiple compression stages, and can be combined with intermediate cooling. The Primary can consist of single or multiple compressor frames, and can be potentially combined with Booster compressor frame(s).

Hyper-compressor (Hyper), or Secondary compressor, is a device that compresses, for example, the following: the ethylene coming from the HPR (High Pressure Recycle) and/or the Primary compressor; each to a pressure level required to feed the reactor at its inlet pressure set point. This compression can take place in one or multiple compression stages, and can be combined with intermediate cooling. The Hyper typically comprises a plunger reciprocating compressor, and can consist of single or multiple compressor frame(s).

Feeding a high reactive comonomer could include pressurizing and feeding the reactive comonomer with an ultra high pressure reciprocating plunger pump, directly to a reactor zone and/or to a feed stream to the reaction zone, and/or feeding the reactive comonomer by a combination of pressurizing with a high pressure pump, and further compressing through reciprocating plunger compressors (for example, Hyper, Primary and/or Booster).

Dipole Moment is a term known in the art, and is used as a measurement of the net molecular polarity of a molecule. The dipole moments of molecules are typically reported in Chemical Handbooks, such as, for example, "CRC Handbook of Chemistry and Physics;" 92nd edition, 2011; and "CDC Handbook of Chemistry and Physics;" $49^{th}$ edition, 1968.

The term "non-aromatic polar compound," as used herein, refers to an aliphatic compound that comprises at least one heteroatom (for example, O, N, S or P).

The term "comonomer containing acid and/or ester groups," as used herein, refers to a comonomer comprising a carboxylic acid group and/or an ester group.

The terms "comprising," "including," "having," and their derivatives, are not intended to exclude the presence of any additional component, step or procedure, whether or not the same is specifically disclosed. In order to avoid any doubt, all compositions claimed through use of the term "comprising" may include any additional additive, adjuvant, or compound, whether polymeric or otherwise, unless stated to the contrary. In contrast, the term, "consisting essentially of" excludes from the scope of any succeeding recitation any other component, step, or procedure, excepting those that are not essential to operability. The term "consisting of" excludes any component, step, or procedure not specifically delineated or listed.

Test Methods

Density: Samples for density measurement are prepared according to ASTM D 1928. Polymer samples are pressed at 190° C. and 30,000 psi (207 MPa) for three minutes, and then at 21° C. and 207 MPa for one minute. Measurements are made within one hour of sample pressing using ASTM D792, Method B.

Melt Index: Melt index, or $I_2$, (grams/10 minutes or dg/min) is measured in accordance with ASTM D 1238, Condition 190° C./2.16 kg. $I_{10}$ is measured with ASTM D 1238, Condition 190° C./10 kg.

Experimental

Reagents

Table 1 lists the reagents used in the studies below, the supplier, and the purity of each reagent.

TABLE 1

Reagents

| Reagent | Company | Purity |
|---|---|---|
| Acrylic Acid (AA) | DOW | Anhydrous, contains 180-200 ppm MEHQ as inhibitor, Purity 99% |
| Phenothiazine (PTZ) | Sigma Aldrich | Purity >98% |
| 4-Hydroxy Tempo (4-HT) | Sigma Aldrich | Purity 97% |
| HYDROBRITE 380* | Sonneborn | Mineral oil |
| Polypropylene glycol | Sigma Aldrich | Average Mn ~425 |
| Diethylene glycol dimethyl ether (Diglyme) | Sigma Aldrich | anhydrous, purity 99.5% |

*The mineral oil manufactured according to USP convention.

Study I—Acrylic Acid (AA) Self Polymerization Study

Inside a clean, nitrogen atmosphere drybox, acrylic acid (AA) plus inhibitor (PTZ or 4-HT), oil or diluent, were mixed together in a 40 ml vial, at ambient temperature, and sealed with a screw cap with an inert sealing layer. The vial was then removed from the drybox, and placed in a heated shaker set at 100° C. Every ten minutes, the content of the vial was observed for any signs of polymerization. As soon as polymer was noticed by visual appearance of cloudiness, the experiment was stopped, and the time of polymerization recorded. In all cases, the inhibitor was pre-mixed with the acrylic acid, inside the dry box, at ambient temperature, before the addition of the oil or diluent. Results are shown in Tables 2, 3 and 4.

TABLE 2

Self-Polymerization of AA

| Run | Acrylic Acid (g) | PTZ amount in the Acrylic Acid (ppm)** | Oil (g) | Oil | Time to polymerize |
|---|---|---|---|---|---|
| 1 | 10 | 0 | 0 | none | 10 mins |
| 2 | 10 | 1 | 0 | none | 35 mins |
| 3 | 10 | 5 | 0 | none | 22.5 hours |
| 4 | 10 | 20 | 0 | none | 72 hours |
| 5 | 5 | 0 | 5 | Mineral oil | 30 mins |
| 6 | 5 | 1 | 5 | Mineral oil | 6 hours |
| 7 | 5 | 5 | 5 | Mineral oil | 48 hours |
| 8 | 5 | 20 | 5 | Mineral oil | Greater than 48 hours |

**Amount of PTZ (in wt ppm) relative to amount of AA and also, independently, relative to the amount of oil, in those samples containing oil (Amt of oil (g) = Amt of AA (g)).

TABLE 3

Self-Polymerization of AA

| Run | Acrylic Acid (g) | 4-HT amount in the Acrylic Acid (ppm)** | Oil (g) | Oil | Time to polymerize |
|---|---|---|---|---|---|
| 9 | 10 | 0 | 0 | none | 10 min |
| 10 | 10 | 1 | 0 | none | 30 min |
| 11 | 10 | 5 | 0 | none | 2 hour |
| 12 | 5 | 0 | 5 | Mineral oil | 30 min |
| 13 | 5 | 1 | 5 | Mineral oil | 30 min |
| 14 | 5 | 5 | 5 | Mineral oil | 2 hour |

**Amount of 4-HT (in wt ppm) relative to amount of AA, and also, independently, relative to the amount of oil, in those samples containing oil (Amt of oil (g) = Amt of AA (g)).

TABLE 4

Self-Polymerization of AA

| Run | Acrylic Acid (g) | PTZ amount in the Acrylic Acid (ppm)* | Diluent (g) | Diluent | Time to polymerize |
|---|---|---|---|---|---|
| 1 | 10 | 0 | 0 | none | 10 mins |
| 2 | 10 | 1 | 0 | none | 35 mins |
| 3 | 10 | 5 | 0 | none | 22.5 hours |
| 4 | 10 | 20 | 0 | none | 72 hours |
| 19 | 5 | 0 | 5 | Polypropylene Glycol | 10 mins |
| 20 | 5 | 1 | 5 | Polypropylene Glycol | 10 mins |
| 21 | 5 | 5 | 5 | Polypropylene Glycol | 10 mins |
| 22 | 5 | 20 | 5 | Polypropylene Glycol | 10 mins |
| 23 | 5 | 0 | 5 | Diglyme | 10 mins |
| 24 | 5 | 1 | 5 | Diglyme | 10 mins |
| 25 | 5 | 5 | 5 | Diglyme | 10 mins |
| 26 | 5 | 20 | 5 | Diglyme | 10 mins |

*Amount of PTZ (in ppm) relative to amount of AA, and also, independently, relative to the amount of diluents, in those samples containing a diluent (Amt diluent (g) = Amt AA (g)).

As seen in Table 2, phenothiazine (PTZ), at very low levels, can be used to effectively inhibit acrylic acid (AA) self-polymerization. Comparing runs 1-4 to runs 5-, 8 it can also be seen that the addition of the mineral oil to the acrylic acid also increases the time to self-polymerization. The addition of phenothiazine and oil to the acrylic acid further increases self-polymerization times. Similar results are observed in Table 3 with the use of the 4-Hydroxy Tempo (4-HT) inhibitor.

In Table 4, experiments were performed with polar diluents, including polypropylene glycol (Dipole Moment of about 2.0-2.5 debye) and diglyme (Dipole Moment of about 1.9-2.0 debye). Surprisingly, in these cases, the self-polymerization rate was not reduced by the addition of these diluents, and there was no inhibition realized from using higher levels of the phenothiazine inhibitor.

Polymerization Design

FIG. 1 shows a generalized flow scheme of a high pressure (co)polymerization plant with a reactor system containing an autoclave reactor, tubular reactor, or combination of both autoclave and tubular reactors (Reactor in FIG. 1). Stream (1) represents the fresh ethylene make-up, which is compressed, together with the outlet of the Booster compressor (Booster), by the Primary compressor (Primary), to stream (2). Stream (2) is combined with the high pressure recycle stream (17) from the High Pressure Separator (HPS), and fed to the suction inlet(s) of the Hyper compressor (Hyper). The Hyper compresses the ethylene feed streams to a level sufficient to feed to the high pressure reactor (Reactor). Although not depicted, the flow scheme could also include a partial combination and/or distribution of the stream (2) and stream (17) over two or more inlets of the Hyper-compressor.

Stream (4), (5) and/or (15) depict the CTA system make-up feed. The CTA make-up can be fed through stream (15) in the Booster/Primary compressor area, or through stream (4) and (5). In principle, the CTA make-up can be freely distributed over the main compression streams, and/or fed and/or distributed over the side stream (8) and front stream (9). CTA make-up streams (4) and/or (5) can be fed in the inlet(s), interstage(s), or outlet(s) of the Hyper-compressor and/or inlet(s) of the reaction zones. The CTA system can consist of single and/or multiple components, and can include varying compositions.

Stream (6), (7) and/or (18) depict the comonomer feed. The comonomer feed can be injected in the Hyper-compressor inlet stream (3) or through stream (6) and (7), and in principle, can be freely distributed over the main compression streams fed to, and/or distributed over, the side stream (8) and/or front stream (9). Comonomer streams (6) and/or (7) can be fed in the inlet(s), interstage(s), or outlet(s) of the Hyper, fed to individual ethylene feed streams to the reactor, and/or fed directly into the reaction zones. The discharge temperature of the Hyper-compressor is typically in the range of 60 to 100° C.

In the Reactor, the polymerization is initiated with the help of a free radical initiation system, injected into, and/or activated in, each reaction zone. The maximum temperature in each reaction zone is controlled at a set point, by regulating the concentration and/or feed amount of initiation system injected in each reaction zone. The reactor system can comprise an autoclave and/or tubular reactor. The Reactor can consist of single and/or multiple autoclave and/or tubular reaction zones.

After finishing the reaction, and having applied multiple cooling steps, the reaction mixture is depressurized and/or cooled in (10) and separated in the high pressure separator (HPS). The HPS separates the reaction mixture into an ethylene rich stream (15), containing minor amounts of waxes and/or entrained polymer, and a polymer rich stream (11) which is sent for further separation to the Low Pressure Separator (LPS). Ethylene stream (15) is cooled and cleaned in stream (17). Stream (16) is a purge stream to remove impurities and/or inerts.

The polymer separated in LPS is further processed in (12). The ethylene removed in the LPS is fed (via stream 13) to the Booster, where, during the compression, condensables such as solvent, lubrication oil, unconverted comonomer and others are collected and removed through stream (14). The outlet of the Booster is combined with make-up ethylene stream (1), and further compressed by the Primary compressor.

The reactor system shown in FIG. 1 does not exclude different configurations of Booster, Primary and Hyper compressor line-up to the Reactor. Furthermore make up feed streams like CTA and comonomer can be fed at different locations in the Booster/Primary/Hyper compressor section and/or to the Reactor directly. Initiator can be injected in an ethylene reactor feed stream prior to entering a reaction zone, or into a reaction zone directly.

Three potential polymerization scenarios are discussed below.

Scenario 1

An ultra high pressure compressor (for example, a Hyper-compressor) compresses ethylene gas with 1-4 wt % of a comonomer containing acid and/or ester groups (for example, acrylic acid), from high pressure recycle pressure up to the reactor pressure of ≥100 MPa. The discharge pressure of the ultra high pressure compressor is 120 MPa. An inventive composition, as described herein, is pumped continuously, at ≥5 lbs/hr (for example, at 25 lbs/hr), at high pressure, into the packing lubrication ports for each cylinder of the ultra high pressure compressor. The lubrication rate for the entire compressor is, for example, approximately 25 lbs/hr. The inventive composition is in intimate contact with comonomer in the packing sets, and prevents self polymerization of the comonomer in those areas. Cylinder life increases, due to reduction of polymer formation of the comonomer in the packing sets.

Scenario 2

An ultra high pressure reciprocating, positive displacement pump is used to inject a comonomer containing acid and/or ester groups (for example, acrylic acid), downstream of a Hyper compressor at a reactor pressure ≥100 MPa. An inventive composition, as described herein, is pumped continuously, at ≥5 lbs/hr (for example, at 25 lbs/hr), at high pressure, into the seals for each cylinder of the positive displacement pump. The inventive composition is in intimate contact with the comonomer that is in the pump seals, and prevents self polymerization in the seal area. Pump seal life increases, due to the reduction of polymer accumulation in the seals.

Scenario 3

An agitator is used to mix the reactor contents in a high pressure reactor operated at a pressure ≥100 MPa. The agitator consists of a motor, stirrer shaft with paddles, and bearing assemblies. An inventive composition, as described herein, is pumped continuously at ≥5 lbs/hr (for example, at 25 lbs/hr), into each bearing housing on the stirrer shaft. The inventive composition is in intimate contact with a comonomer containing acid and/or ester groups (for example, acrylic acid), and prevents polymer accumulation in these areas. Bearing life increases due to the reduction of polymer accumulation in the bearings.

The invention claimed is:

1. A composition comprising at least the following:

A) an oil, and

B) at least one compound selected from the following compounds i) through iii):

i)

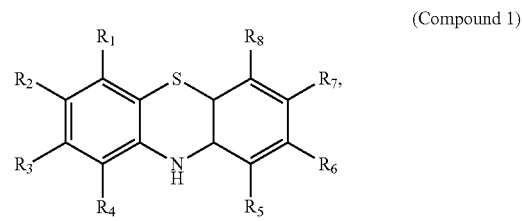

(Compound 1)

wherein, for Compound 1, R1, R2, R3, R4, R5, R6, R7 and R8 are each independently selected from H, an alkyl, or an alkoxy;

ii)

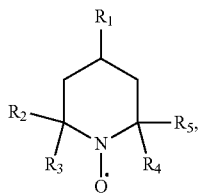

(Compound 2)

i)

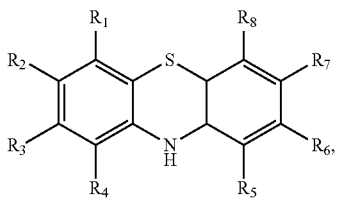

(Compound 1)

wherein, for Compound 2, R1 is selected from OH or O—R, wherein R is alkyl; and R2, R3, R4 and R5 are each independently selected from H, an alkyl, or an alkoxy; or iii) a combination of Compounds 1 through 2; and wherein the composition comprises less than, or equal to, 1.0 weight percent (based on the weight of the composition) of a non-aromatic polar compound, excluding alcohols, and other than Compound 2 above, and wherein the non-aromatic compound has a Dipole Moment greater than, or equal to, 1.00 Debye; and wherein component B is present in an amount from 5 to 100 ppm, based on the weight of the composition.

2. The composition of claim 1, wherein the oil and compound comprise greater than, or equal to, 99.0 weight percent of the composition, based on the weight of the composition.

3. The composition of claim 1, wherein the compound is selected from:

b)

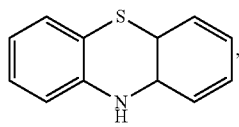

Phenothiazine
(PTZ)

c)

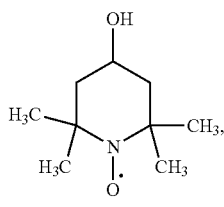

4-hydroxy Tempo or d) a combination thereof.

4. The composition of claim 1, wherein the at least one compound is present in an amount from 5 to 100 ppm, based on the weight of the oil.

5. The composition of claim 1, wherein the at least one compound is selected from Compound 1:

wherein, for Compound 1, R1, R2, R3, R4, R5, R6, R7 and R8 are each independently selected from H, an alkyl, or an alkoxy.

6. A process to prepare an ethylene-based interpolymer, said process comprising polymerizing a mixture comprising ethylene and at least one comonomer containing acid and/or ester groups, at a pressure greater than, or equal to, 100 MPa, in the presence of at least one free-radical initiator; and in a reactor system comprising at least one reactor and at least one component selected from the following:

a) a reciprocation device,
b) a rotation device,
c) or combination thereof; and wherein the composition of claim 1 is injected into the at least one component.

7. The process of claim 6, wherein, during the polymerization, the composition is continually injected into the at least one component.

8. The process of claim 6, wherein the at least one component is a reciprocation device.

9. The process of claim 8, wherein the reciprocation device is a Hyper-compressor.

10. The process of claim 9, wherein the discharge pressure in the Hyper-compressor is from 100 MPa to 400 MPa.

11. The process of claim 9, wherein the composition is injected at one or more injection points into the Hyper-compressor.

12. The process of claim 6, wherein the comonomer is selected from acrylic acid, ethylene acrylate, or a combination thereof.

13. A process to reduce polymer build-up in a reciprocation device and/or rotational device, used in the polymerization of a mixture comprising ethylene and at least one comonomer containing acid and/or ester groups, said process comprising injecting the composition of claim 1 into the reciprocation device and/or rotational device.

14. The process of claim 13, wherein, during the polymerization, the composition is continually injected into the reciprocation device and/or rotational device.

15. The process of claim 14, wherein the composition is injected at a rate of 2 to 150 lbs/hr.

16. The process of claim 13, wherein the composition is injected into a reciprocation device.

17. The process of claim 16, wherein the reciprocation device is a Hyper-compressor.

18. The process of claim 17, wherein the composition is injected at one or more injection points into the Hyper-compressor.

19. The process of claim 13, wherein the comonomer is selected from acrylic acid, ethylene acrylate, or a combination thereof.

\* \* \* \* \*